United States Patent
Smith et al.

(10) Patent No.: US 7,434,089 B2
(45) Date of Patent: Oct. 7, 2008

(54) SYSTEM AND METHOD FOR LOADING SOFTWARE INTO A CONTROL PANEL FOR A CHILLER SYSTEM

(75) Inventors: Bart Andrew Smith, York, PA (US); Jeffrey Daniel Boyer, York, PA (US)

(73) Assignee: York International Corporation, York, PA (US)

( * ) Notice: Subject to any disclaimer, the term of this patent is extended or adjusted under 35 U.S.C. 154(b) by 703 days.

(21) Appl. No.: 10/917,035

(22) Filed: Aug. 12, 2004

(65) Prior Publication Data

US 2005/0039471 A1 Feb. 24, 2005

Related U.S. Application Data

(60) Provisional application No. 60/495,411, filed on Aug. 15, 2003.

(51) Int. Cl.
*G06F 11/00* (2006.01)
(52) U.S. Cl. .......................................... 714/6
(58) Field of Classification Search ............ 714/6
See application file for complete search history.

(56) References Cited

U.S. PATENT DOCUMENTS

| | | | |
|---|---|---|---|
| 5,586,270 A | 12/1996 | Rotier et al. | |
| 5,590,373 A | 12/1996 | Whitley et al. | |
| 5,604,906 A | 2/1997 | Murphy et al. | |
| 5,831,852 A | 11/1998 | Cahill-O'Brian et al. | |
| 5,898,869 A | 4/1999 | Anderson | |
| 6,125,409 A | 9/2000 | Le Roux | |
| 6,154,788 A | 11/2000 | Robinson et al. | |
| 6,170,026 B1 | 1/2001 | Kimura et al. | |
| 6,179,214 B1 | 1/2001 | Key et al. | |
| 6,182,170 B1 | 1/2001 | Lee et al. | |
| 6,301,656 B1 | 10/2001 | Streett et al. | |
| 6,330,806 B1 * | 12/2001 | Beaverson et al. | ............ 62/201 |
| 6,332,327 B1 | 12/2001 | Street et al. | |

(Continued)

FOREIGN PATENT DOCUMENTS

EP 887 729 12/1998

(Continued)

*Primary Examiner*—Michael C Maskulinski
(74) *Attorney, Agent, or Firm*—McNees Wallace & Nurick, LLC (57) ABSTRACT

A system and process for loading control software into the control panel of a liquid chiller system is provided. A PCMCIA card socket is installed on a circuit board of a liquid chiller control system and is in direct connection with microprocessor data and address buses. A linear flash PCMCIA card having new control software for the control panel is inserted into the PCMCIA card socket when the control panel is de-energized. The control software from the PCMCIA card is loaded into a flash memory of the control system by software executed directly from the PCMCIA card. The software in the PCMCIA card erases the flash memory of the control system, copies the control software from the PCMCIA card to the flash memory and then confirms that the copy of the control software was successful. After the control software has been copied, the control panel is de-energized, the PCMCIA card is removed and the chiller system is restarted and executes the new control software stored in the flash memory.

26 Claims, 5 Drawing Sheets

U.S. PATENT DOCUMENTS

| | | |
|---|---|---|
| 6,353,927 B1 | 3/2002 | Ali et al. |
| 6,381,662 B1 | 4/2002 | Harari et al. |
| 6,405,362 B1 * | 6/2002 | Shih et al. .................. 717/174 |
| 6,434,034 B1 | 8/2002 | Wallace et al. |
| 6,453,689 B2 | 9/2002 | Wada |
| 6,478,222 B1 | 11/2002 | Sarfati |
| 6,483,906 B1 | 11/2002 | Iggulden et al. |
| 2003/0074658 A1 * | 4/2003 | Kim ........................... 717/168 |
| 2005/0193389 A1 * | 9/2005 | Murphy et al. .............. 717/175 |
| 2007/0067581 A1 * | 3/2007 | Baek .......................... 711/153 |

FOREIGN PATENT DOCUMENTS

| | | |
|---|---|---|
| WO | WO 97/49028 | 12/1997 |
| WO | WO 01/67005 A1 | 9/2001 |

\* cited by examiner

SYSTEM AND METHOD FOR LOADING SOFTWARE INTO A CONTROL PANEL FOR A CHILLER SYSTEM

CROSS-REFERENCE TO RELATED APPLICATIONS

This application claims the benefit of U.S. Provisional Application No. 60/495,411 filed Aug. 15, 2003.

BACKGROUND OF THE INVENTION

The present invention relates generally to loading software into a control panel. More specifically, the present invention relates to the loading of control software into the control panel of a liquid chiller system using a linear flash PCMCIA card.

The operation of a liquid chiller system can be controlled by a control software program(s) executed by a microprocessor on a control panel of the liquid chiller system. The microprocessor based control system typically includes a non-volatile memory device(s) or memory residing on a circuit board (s) in the control panel for storing the software program executed by the microprocessor during normal operation of the liquid chiller system. In microprocessor based control systems requiring only a small amount of memory for program storage, the non-volatile memory used in the control system typically resides in sockets on the circuit board, which socket configuration provides for easy insertion and removal of the memory. The non-volatile memory used for storing the smaller programs can include an erasable programmable read only memory (EPROM), an electrically erasable programmable read only memory (EEPROM), or a flash memory.

For microprocessor based control systems requiring a larger amount of memory for program storage, the control system typically has to use either several of the smaller, socket-based memory devices on the circuit board as described above, which usage of several memory devices may involve the occupation of a substantial portion of the circuit board, or a larger memory device (e.g., greater than 1 megabyte of storage capability) that is permanently installed, e.g., soldered, on the circuit board. The memory used for storing the larger programs can include a flash memory or, alternatively, a memory device that requires a separate controller, e.g., a hard disk drive or a compact flash card.

Many times during the operational life of the liquid chiller system, the control program executed by the microprocessor has to be updated or replaced. The updating of the control program can result in a new control program that provides more efficient operation of the liquid chiller system or that corrects errors that were present in the prior control program. To update a control program stored in a socket-based memory device, the old memory device storing the prior control program must be removed and a new memory device storing the new control program must be inserted. If several socket-based memory devices are used, the memory devices must be extracted and replaced in the correct order to ensure proper operation of the liquid chiller system. One drawback of this type of software update is that it can result in a substantial cost for the software update because of having to obtain new memory devices with the new control program.

To update a control program stored in a permanently installed memory device, the memory device must either be replaced with a new memory device through a difficult and time consuming process or provide for an electronic update of the memory device from a memory card or other medium. Typically, in an electronic update of the memory device, the memory card is an advanced technology attachment (ATA) or integrated drive electronics (IDE) configured flash memory card. To update a memory device using the ATA or IDE flash memory card, an intermediate controller has to read the information and control program stored on the flash memory card and then transfer the information and control program to the memory device on the circuit board for subsequent access by the microprocessor. One drawback of this technique is that the need for the intermediate controller increases the cost and the complexity of the control panel.

One technique for updating control software is provided in U.S. Pat. No. 6,330,806. In this technique, a flash miniature card having the control program for the system is installed or inserted into a card socket on the control panel and remains in the card socket during operation of a heating, ventilation and air conditioning (HVAC) system. The microprocessor reads the control program directly from the flash miniature card in order to control the HVAC system. A software update is completed by removing the current flash miniature card and inserting a new flash miniature card with the new control program. One disadvantage of this technique is that one card can be used to update only one system.

Another technique for updating control software is provided in U.S. Pat. No. 5,831,852. In this technique, a card is inserted into a card reader during operation of the system, which triggers a pulse generator to generate a signal for a microprocessor. In response to this signal from the pulse generator, the microprocessor identifies the first addressable storage location in memory for the control software, which can be in a higher ordered addressable memory bank or in a lowered order addressable memory bank. Selection logic uses signals from the microprocessor (highest ordered address bit) and from the card reader to determine whether to address the memory bank which is to store the control software or to address the card. The copying of the program is completed by executing a copy program stored on the card, which provides for the microprocessor to receive the information from the card and transmit the information to the appropriate memory bank. One disadvantage of this invention is that involves complicated circuitry to determine where to store the control software and when to initiate the copying process.

Therefore, what is needed is an economical control panel configuration that can provide for the quick, easy and repeated loading and updating of control software into the control panel of a liquid chiller system.

SUMMARY OF THE INVENTION

One embodiment of the present invention is directed to a method of loading software into a control panel of a chiller system. The method includes the steps of inserting a linear flash PCMCIA card into a corresponding socket on a control panel of a chiller system and initializing the chiller system with a boot program stored on the linear flash PCMCIA card. The method also includes the step of copying a software program stored on the linear flash PCMCIA card to a memory device on the control panel with a copy program stored on the linear flash PCMCIA card. Finally, the method includes the step of removing the linear flash PCMCIA card from the corresponding socket on the control panel of the chiller system.

Another embodiment of the present invention is directed to a control panel for a chiller system. The control panel includes a microprocessor and a PCMCIA connector configured to receive a linear flash PCMCIA card. The PCMCIA connector is connected to the microprocessor by an address bus and a data bus to provide direct communication between the PCMCIA connector and the microprocessor. The control panel also includes an application memory connected to the address bus and the data bus and a boot memory connected to the address bus and the data bus. The application memory is configured to store control software and the boot memory is configured to store initialization software. Finally, the control panel includes steering logic configured to initiate execution of initialization software stored in one of the boot memory or a linear flash PCMCIA card inserted in the PCMCIA connector.

Still another embodiment of the present invention is directed to a method of loading software onto a plurality of chiller system control panels. The method includes the steps of inserting a linear flash PCMCIA card into a corresponding socket on a control panel of a chiller system and initializing the chiller system with a boot program stored on the linear flash PCMCIA card. The method also includes the steps of copying a software program stored on the linear flash PCMCIA card to a memory device on the control panel with a copy program stored on the linear flash PCMCIA card and removing the linear flash PCMCIA card from the corresponding socket on the control panel of the chiller system. Finally, the method includes the step of repeating the steps of inserting a linear flash PCMCIA card, initializing a chiller system, copying a software program, and removing the linear flash PCMCIA card for another chiller system control panel.

One advantage of the present invention is that the control program(s) stored in memory can be updated electronically without having to replace memory devices on a circuit board in the control panel.

Another advantage of the present invention is that the cost of memory devices and support components in the control panel is minimized, thereby lowering the cost of the entire chiller system.

Still another advantage of the present invention is that a control program can be loaded into a control panel without the control panel having a boot program for the control system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
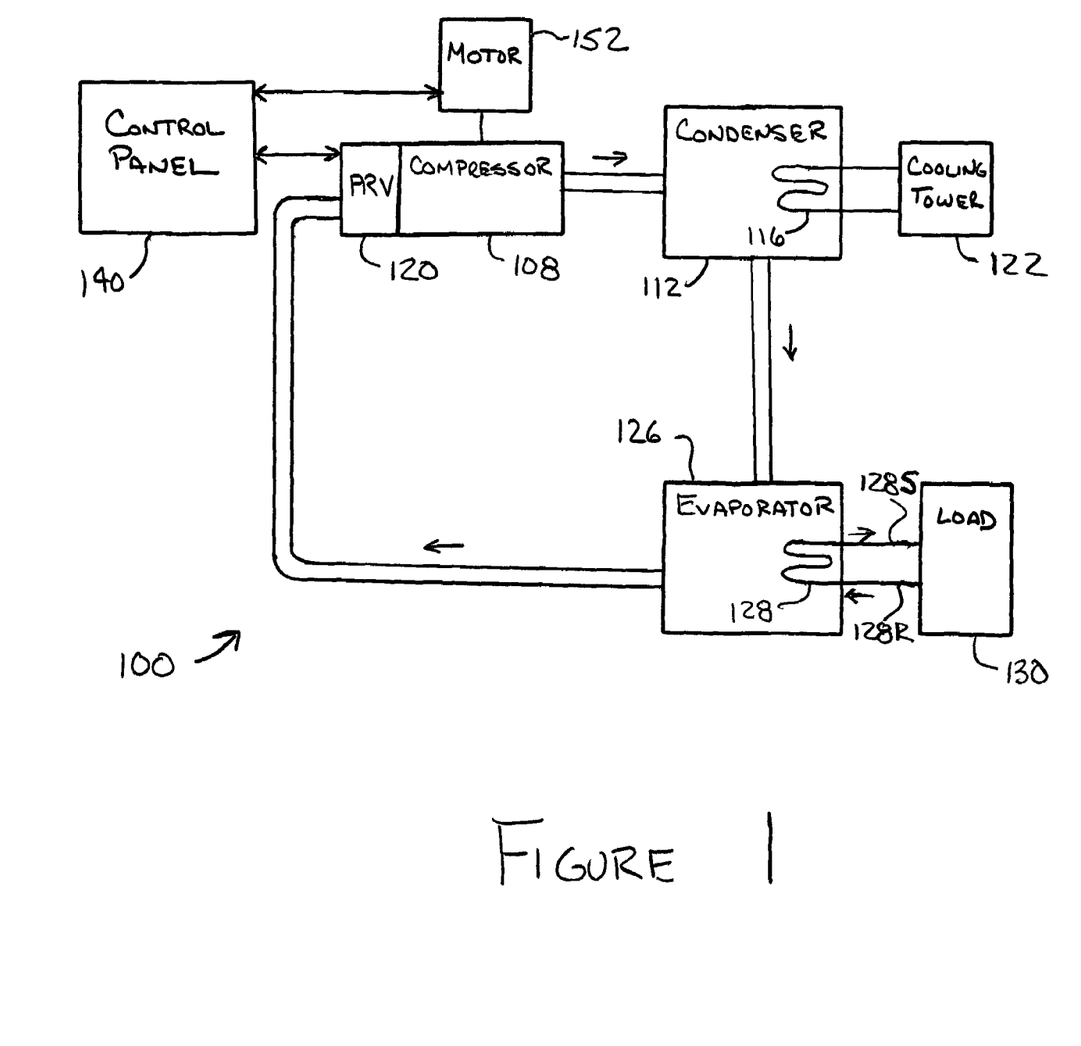
FIG. 1 illustrates schematically a liquid chiller system of the present invention.

A general system to which the invention can be applied is illustrated in FIG. 1. As shown, the heating, ventilation, and air conditioning (HVAC), refrigeration or liquid chiller system 100 includes a compressor 108, a condenser 112, a water chiller or evaporator 126, and a control panel 140, which control panel 140 can be positioned locally and/or remotely to the system 100. The control panel 140 receives input signals from the system 100, e.g., temperature and pressure measurements, that indicate the performance of the system 100 and transmits signals to components of the system 100, e.g., a compressor capacity control signal, to control the operation of the system 100. The configuration of the control panel 140 and the loading of software into the control panel 140 will be discussed in greater detail below. The conventional liquid chiller system 100 includes many other features that are not shown in FIG. 1. These features have been purposely omitted to simplify the drawing for ease of illustration. While the following description of system 100 is in terms of a liquid chiller system, it is to be understood that the invention could be applied to any refrigeration system or any HVAC system.

Compressor 108 compresses a refrigerant vapor and delivers the vapor to the condenser 112 through a discharge line. The compressor 108 is preferably a centrifugal compressor; however, the compressor 108 can be any suitable type of compressor including screw compressor, reciprocating compressor, scroll compressor, rotary compressor or other type of compressor. In another embodiment of the present invention, the system 100 can have more than one compressor 108 connected in one or more refrigerant circuits.

The refrigerant vapor delivered to the condenser 112 enters into a heat exchange relationship with a fluid, e.g., air or water, and undergoes a phase change to a refrigerant liquid as a result of the heat exchange relationship with the fluid. The condensed liquid refrigerant from condenser 112 flows to the evaporator 126. In a preferred embodiment, the refrigerant vapor in the condenser 112 enters into the heat exchange relationship with water, flowing through a heat-exchanger coil 116 connected to a cooling tower 122. The refrigerant vapor in the condenser 112 undergoes a phase change to a refrigerant liquid as a result of the heat exchange relationship with the water in the heat-exchanger coil 116.

The evaporator 126 can preferably include a heat-exchanger coil 128 having a supply line 128S and a return line 128R connected to a cooling load 130. The heat-exchanger coil 128 can include a plurality of tube bundles within the evaporator 126. A secondary liquid, which is preferably water, but can be any other suitable secondary liquid, e.g., ethylene, calcium chloride brine or sodium chloride brine, travels into the evaporator 126 via return line 128R and exits the evaporator 126 via supply line 128S. The liquid refrigerant in the evaporator 126 enters into a heat exchange relationship with the secondary liquid in the heat-exchanger coil 128 to chill the temperature of the secondary liquid in the heat-exchanger coil 128. The refrigerant liquid in the evaporator 126 undergoes a phase change to a refrigerant vapor as a result of the heat exchange relationship with the secondary liquid in the heat-exchanger coil 128. The vapor refrigerant in the evaporator 126 exits the evaporator 126 and returns to the compressor 108 by a suction line to complete the cycle. While the system 100 has been described in terms of preferred embodiments for the condenser 112 and evaporator 126, it is to be understood that any suitable configuration of condenser 112 and evaporator 126 can be used in system 100, provided that the appropriate phase change of the refrigerant in the condenser 112 and evaporator 126 is obtained.

In the preferred embodiment of the present invention using a centrifugal compressor 108, at the input or inlet to the compressor 108 from the evaporator 126, there are one or more pre-rotation vanes or inlet guide vanes 120 that control the flow of refrigerant to the compressor 108. An actuator is used to open the pre-rotation vanes 120 to increase the amount of refrigerant to the compressor 108 and thereby increase the cooling capacity of the system 100. Similarly, the actuator is used to close the pre-rotation vanes 120 to decrease the amount of refrigerant to the compressor 108 and thereby decrease the cooling capacity of the system 100.

To drive the compressor 108, the system 100 includes a motor or drive mechanism 152 for compressor 108. While the term "motor" is used with respect to the drive mechanism for the compressor 108, it is to be understood that the term "motor" is not limited to a motor, but is intended to encompass any component that can be used in conjunction with the driving of motor 108, such as a variable speed drive and a motor starter. In a preferred embodiment of the present invention, the motor or drive mechanism 152 is an electric motor and associated components. However, other drive mechanisms, such as steam or gas turbines or engines and associated components can be used to drive the compressor 108.

Figure 2:
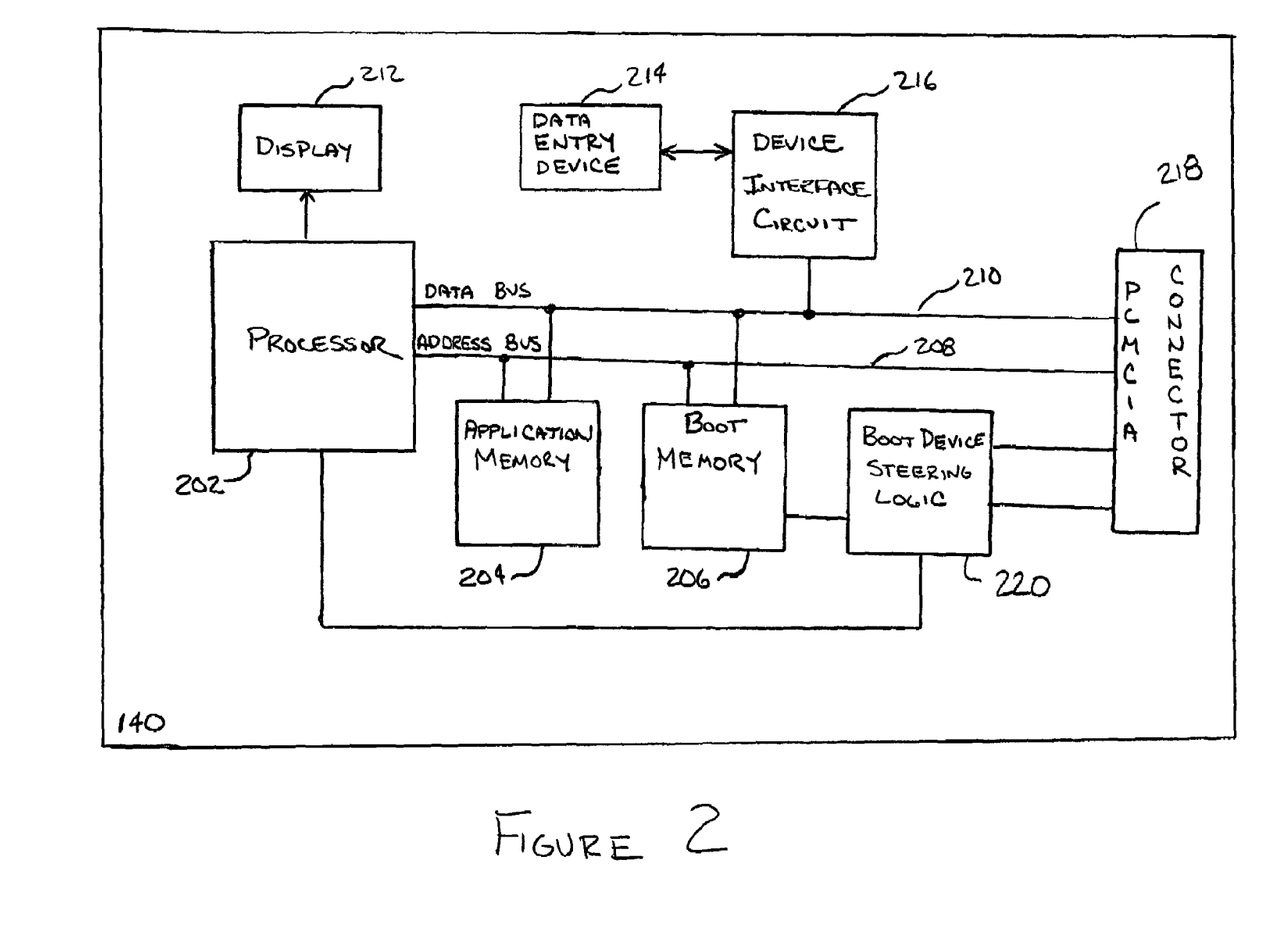
FIG. 2 illustrates schematically one embodiment of a control panel of the present invention.

FIG. 2 illustrates schematically one embodiment of the control panel 140 of the present invention. The control panel 140 has a microprocessor 202 connected to an application memory 204 and a boot memory 206 by an address bus 208 and a data bus 210 to provide for communication between the microprocessor 202 and the application memory 204 and the boot memory 206. The application memory 204 and the boot memory 206 are both preferably non-volatile memory devices, and most preferably flash memory devices. The application memory 204 is preferably used to store the control software or program executed by the microprocessor 202 to control the operation of the system 100 and can range from 1 megabyte in size to 16 megabytes or larger. The boot memory 206 is used to store the initialization or boot software or program, e.g., the system BIOS, that is used upon energizing the control panel 140 to initialize and configure the control panel 140 for subsequent operation.

To provide information to a user or technician of the control panel 140, the control panel 140 has a display 212. In addition, the control panel 140 has a data entry device 214, which is preferably a keypad or other similar type of data entry device, e.g., a touchpad, touch screen, or light pen, operating with an interface circuit 216 to permit the user or technician to provide or enter information into the control panel 140.

A Personal Computer Memory Card International Association (PCMCIA) connector or socket 218 configured to receive a corresponding PCMCIA card is provided on the control panel 140 and is connected to the address bus 208 and the data bus 210 to provide for direct communication between the microprocessor 202 and the PCMCIA connector 218 (and corresponding PCMCIA card). The PCMCIA connector 218 can be any type of connector that supports a linear memory card that can be directly accessed by the microprocessor 202 without the need for an intermediate controller, e.g., a linear flash PCMCIA card or a flash miniature card. The control panel 140 also includes boot device steering logic 220 to determine whether the system 100 and control panel 140 should be booted from a boot program located or stored in the boot memory 206 or in a corresponding PCMCIA card in the PCMCIA connector 218. The use of the boot device steering logic 220 permits the control panel 140 to be booted and operated from the PCMCIA card even though the boot memory 206 may not yet be loaded with a boot program. Finally, it is to be understood that the control panel 140 includes many other features and circuits that are not shown in FIG. 2. These features and circuits have been purposely omitted to simplify the drawing for ease of illustration.

Figure 3:
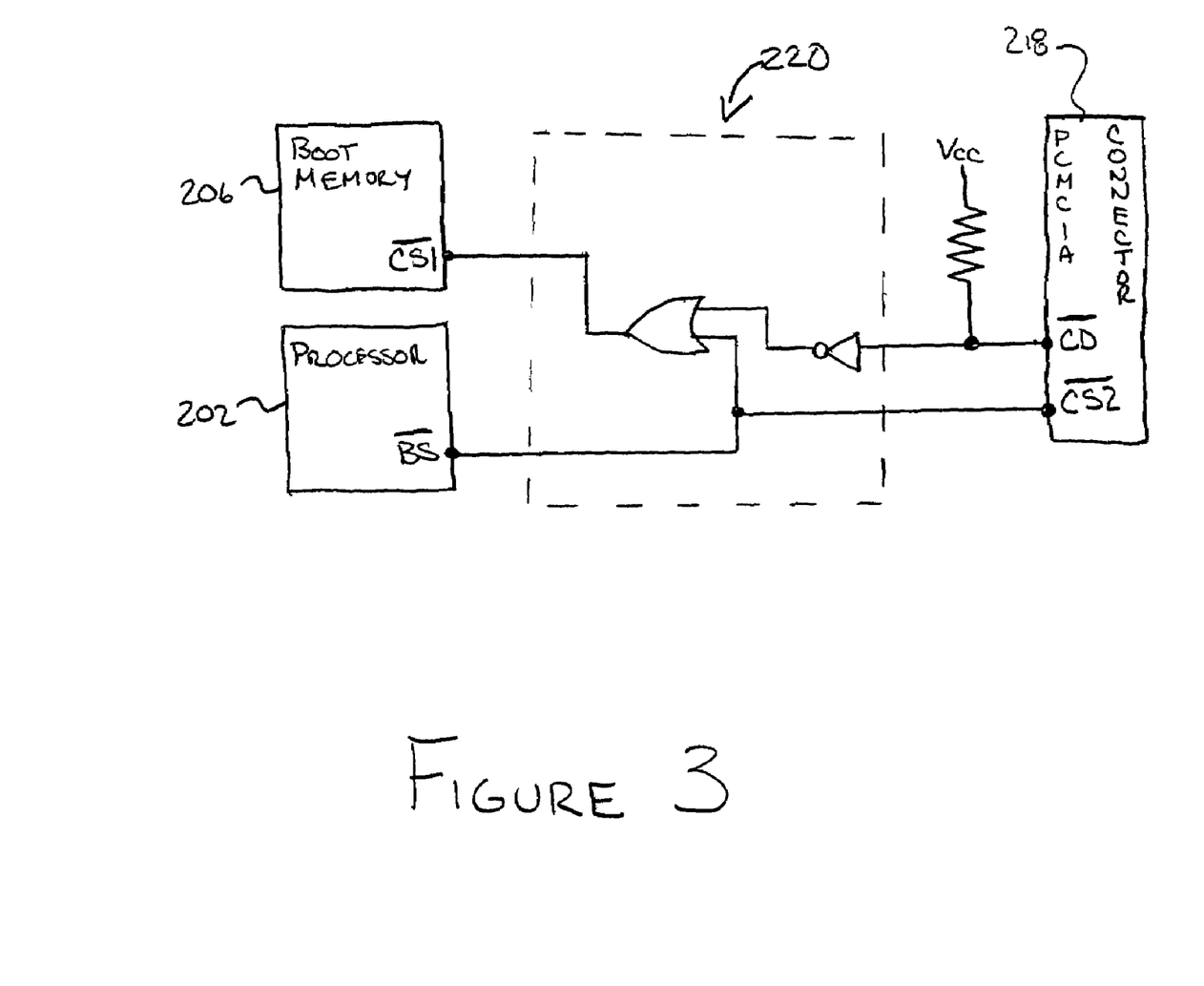
FIG. 3 illustrates an embodiment of the boot device steering logic used with the present invention.

One embodiment of the boot device steering logic 220 is shown in FIG. 3. Whenever the microprocessor 202 has to boot the control panel 140, e.g., on energizing the control panel 140, the microprocessor 202 generates an active low signal, i.e., an action is to be taken on a binary zero, at a BS output of the microprocessor 202. In other words, when the microprocessor 202 has to boot the control panel 140, a binary zero is set at the BS output and during non-booting operations, a binary one is set at the BS output. The BS output signal is then sent or transmitted to the boot device steering logic 220 to determine which device is storing the boot software to be executed by the microprocessor 202. The BS output signal provided to steering logic 220 is one input of an OR gate. The other input of the OR gate is an inverted CD output signal from the PCMCIA connector 218. The CD output signal from the PCMCIA connector 218 is also an active low signal and is set to a binary zero when a PCMCIA card is present in the PCMCIA connector 218 and is set to a binary one, preferably through the operation of a pull-up resistor, when a PCMCIA card is not present in the PCMCIA connector 218.

The output of the OR gate of the steering logic 220 is then provided to the CS1 input of the boot memory 206. The CS1 input of the boot memory 206 is an active low input that enables the microprocessor 202 to access and execute boot software in the boot memory 206 when a binary zero is present at the CS1 input and will inactivate the boot memory 206 when a binary one is present at the CS1 input. Finally, the BS output signal from the microprocessor 202 is provided to the CS2 input of the PCMCIA connector 218. The CS2 input at the PCMCIA connector 218 is an active low input that enables the microprocessor 202 to access and execute boot software on the PCMCIA card in the PCMCIA connector 218 when a binary zero is present at the CS2 input and will not permit execution of boot software on the PCMCIA card in the PCMCIA connector 218 when a binary one is present at the CS2 input.

In other embodiments of the present invention, different logic configurations can be used for the boot device steering logic 220. In addition, active high signals can also be used for some or all of the inputs and outputs to the boot device steering logic 220. For example, using the same inputs and outputs (BS, CD, CS1 & CS2) as shown in FIG. 3, but changing the inputs and outputs (BS, CD, CS1 & CS2) to be active high signals instead of active low signals would result in having to change the OR gate in FIG. 3 to an AND gate in order to obtain the same logic results. Finally, it is to be understood that any combination of active high and active low signals would involve a potentially different configuration of the boot device steering logic 220 to obtain the appropriate logic results.

Figure 4:
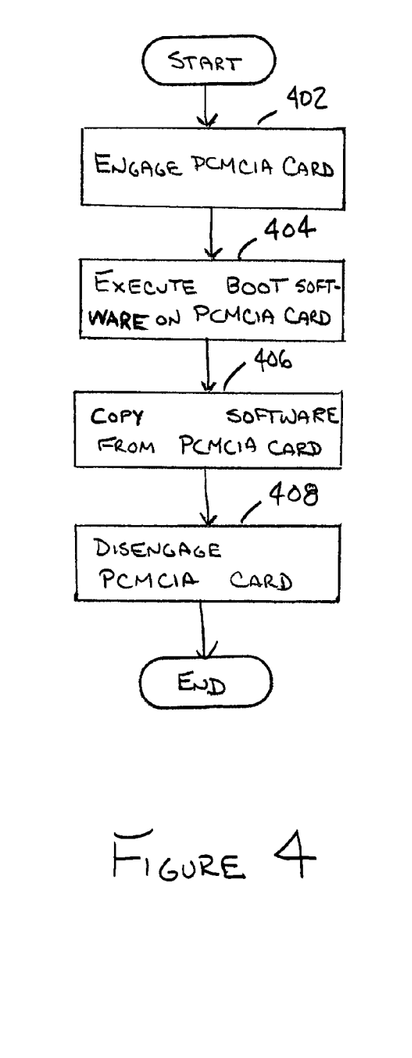
FIG. 4 illustrates a flowchart of the basic process for updating software in the present invention.

FIG. 4 illustrates the basic process for installing or updating software in the application memory 204 of a control panel 140 for a chiller system 100. The process begins at step 402 with the engagement or insertion of the PCMCIA card in the control panel 140. Next, in step 404 the processor 202 executes boot software stored on the PCMCIA card. After the boot software has been executed in step 404, the new or updated control or application software or program(s) stored on the PCMCIA card is copied into the application memory 204 of the control panel 140 in step 406. Finally, in step 408 the PCMCIA card is disengaged or removed from the control panel 140 to end the process. After the control or application software has been copied and stored in the application memory 204 of a control panel 140, the PCMCIA card can be taken to another control panel 140 of a chiller system 100 and the process can be repeated to copy and store the control or application software onto that control panel 140. In addition, as the control or application software for the control panel 140 is updated and changed, the updated control or application software can be stored on a PCMCIA card and the process can be repeated to load the updated software into the control panel 140.

Figure 5:
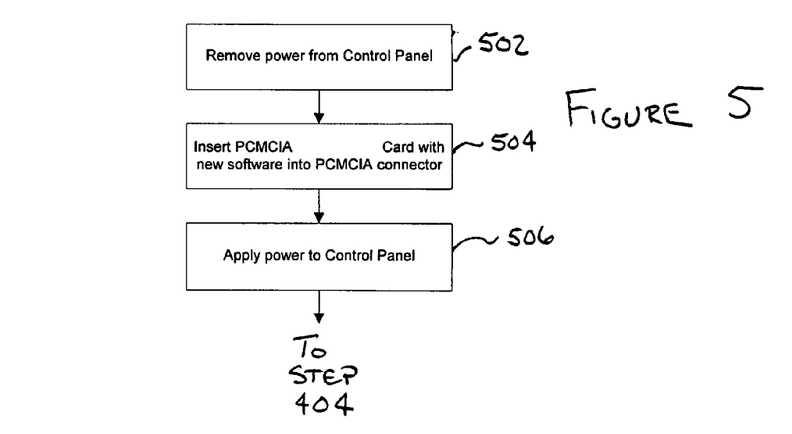
FIG. 5 illustrates a flowchart of the process for engaging the PCMCIA card from step 402 of FIG. 4.

FIG. 5 illustrates the process for engaging the PCMCIA card from step 402 of FIG. 4. The process begins by removing power from the control panel 140 in step 502. Alternatively, this step can be omitted if the control panel 140 is already de-energized. Next, in step 504 the PCMCIA card with the new or updated control or application software for the control panel 140 is inserted into the PCMCIA connector 218. As discussed above, the PCMCIA card is preferably a linear flash PCMCIA card. Finally, in step 506 power is reapplied to the control panel 140. When power is reapplied to the control panel 140, the processor 202 sets the BS output low (binary zero) to indicate that boot software has to be executed and the CD output from the PCMCIA connector 218 is also set low (binary zero) indicating the presence of the PCMCIA card in the PCMCIA connector 218. The boot device steering logic 220 then provides a high signal (binary one) to the CS1 input of the boot memory 206 to disable the boot memory 206 and a low signal (binary zero) to the CS2 input of the PCMCIA connector 218 to enable the PCMCIA card and permit the microprocessor 202 to execute boot software stored on the PCMCIA card as described above with respect to step 404.

Referring back to step 404 of FIG. 4, when the microprocessor 202 begins executing the boot software on the PCMCIA card, the microprocessor 202 can directly access the boot software on the PCMCIA card using the data bus 210 and address bus 208. After the boot software from the PCMCIA card has been executed by the microprocessor 202, the microprocessor 202 then executes a user interface program or routine that prompts the user to initiate the copying process, e.g., by selecting a key on the keypad, as discussed in greater detail below. If the user confirms that the copying process should proceed, an installation program stored on the PCMCIA card begins the process of copying the control or application software on the PCMCIA card into the application memory 204 as described above with respect to step 406.

Figure 6:
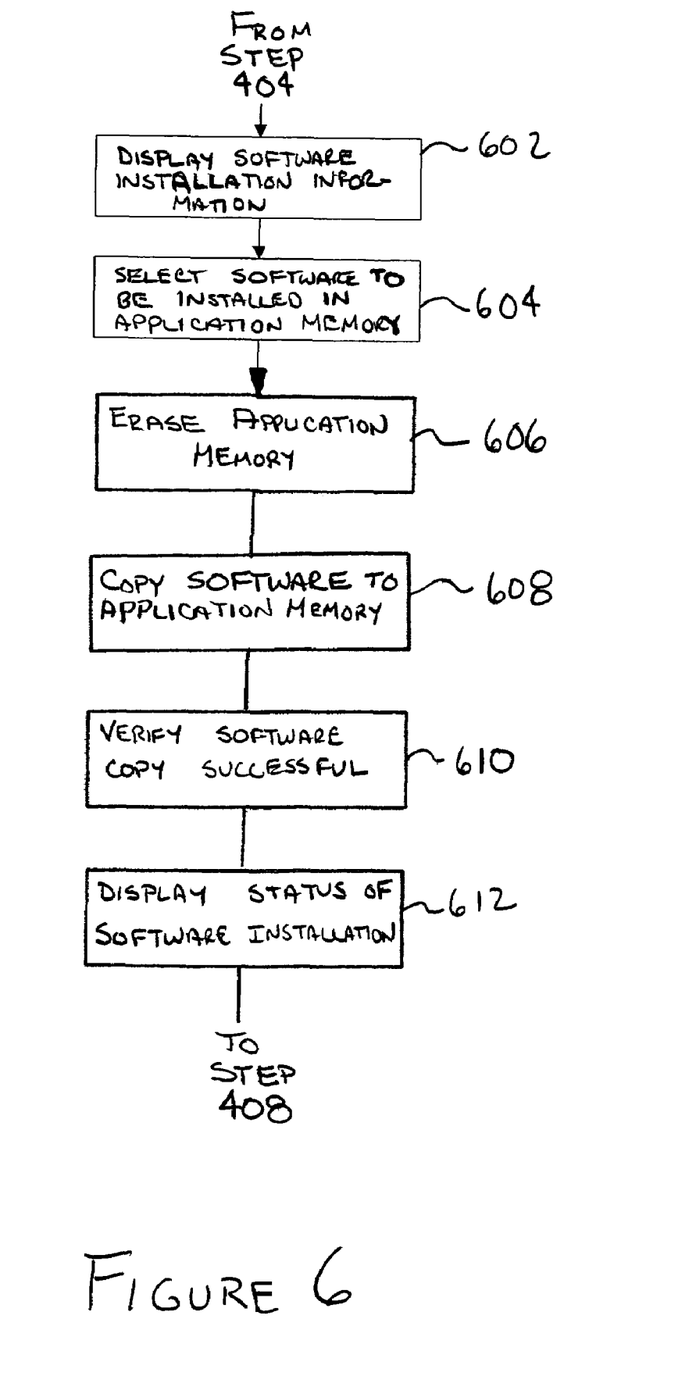
FIG. 6 illustrates a flowchart of the process of copying software from the PCMCIA card from step 406 of FIG. 4.

FIG. 6 illustrates the process for copying the control or application software from the PCMCIA card to the application memory 204. The process begins at step 602 with software installation information being provided to the user or technician on the display 212. The software installation information can include details on the control or application software that is stored on the PCMCIA card such as the name of the software, the version of the software, the size of the software (memory requirement), the date the software was created, etc. In addition, if there are multiple control or application programs stored on the PCMCIA card that are available for installation, then the details on all of the programs stored on the PCMCIA card would be displayed. In step 604, if several control or application programs are stored on the PCMCIA card, the user or technician has to select the particular control program from the PCMCIA card to be installed in the application memory 204, or if there is only one control program stored on the PCMCIA card, the user or technician has to authorize the installation of that program into the application memory 204.

Once the control program has been selected for installation, the application memory 204 is erased in step 606. The erasing procedure for the application memory 204 is dependent upon the particular type of non-volatile memory device selected. After the application memory 204 has been erased, the selected control program is then copied in step 608 from the PCMCIA card to the application memory 204 according to the appropriate copying process for the particular type of non-volatile memory selected. In step 610, a verification process is completed to confirm that the control program has been copied successfully to the application memory 204. In a preferred embodiment of the present invention, the verification process compares, in a word by word or byte by byte manner, information relating to the program stored in the application memory 204 to the corresponding information relating to the program stored in the PCMCIA card memory locations. In another embodiment of the present invention, the verification process includes calculating a checksum value for the copied program in the application memory 204 and comparing the calculated checksum value with a corresponding predetermined checksum value for the program from the PCMCIA card. If the calculated checksum value is equal to the predetermined checksum value, then the program has been copied successfully, otherwise, if the calculated checksum value is not equal to the predetermined value, then the program was not copied successfully. After the verification process is completed in step 610, the user or technician is notified on the display 212 of the status of the software installation in step 612. The user notification may be a message indicating that the program has been copied successfully. Alternatively, the message may indicate that the program has not been copied successfully, and provide the user with information and options on how to proceed. In another embodiment of the present invention, the user or technician can be provided with messages on display 212 indicating the status of the process in steps 608 and 610.

In the embodiment of the present invention having several application or control programs stored on the PCMCIA card, the user or technician may be given the option to install another application or control program into another flash memory device on the control panel 140. The option to install another control or application program would be provided after the completion of the program installation process shown in FIG. 6. To install another program on the control panel 140, the user would have to select or designate the particular flash memory device on the control panel 140 that is to receive the program and then would restart the program installation process discussed above with regard to FIG. 6 to install an application or control program in the selected flash memory device. Following the above process, the user or technician could then install as many programs as desired into flash memory devices on the control panel 140. Once the user has completed the installation of programs from the PCMCIA card, the PCMCIA card can be disengaged as described above in step 408.

Figure 7:
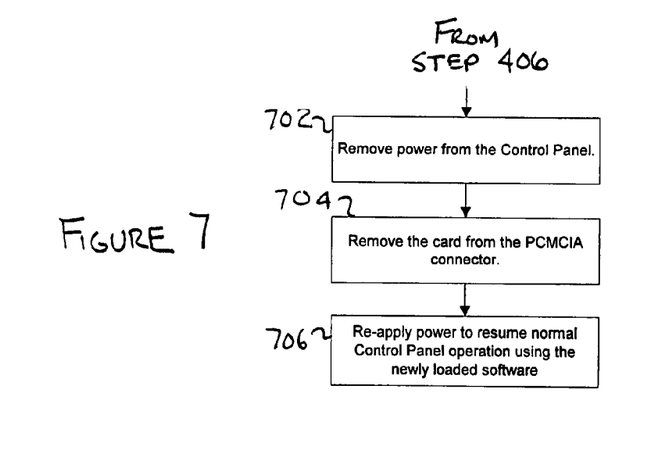
FIG. 7 illustrates a flowchart of the process for disengaging the PCMCIA card from step 408 of FIG. 4.

FIG. 7 illustrates the process for disengaging the PCMCIA card from step 408 of FIG. 4. The process begins by removing power from the control panel 140 in step 702. Next, in step 704 the PCMCIA card is removed from the PCMCIA connector 218. Finally, in step 706 power is reapplied to the control panel 140. When power is reapplied to the control panel 140, the processor 202 sets the BS output low (binary zero) to indicate that boot software has to be executed and the CD output from the PCMCIA connector 218 is now set high (binary one) indicating the absence of the PCMCIA card. The boot device steering logic 220 then provides a low signal (binary zero) to the CS1 input of the boot memory 206, permitting the microprocessor 202 to execute boot software stored in the boot memory 206. While the PCMCIA connector 218 may also receive a low signal at its CS2 input from boot device steering logic 220 depending on the configuration of boot device steering logic 220 (see FIG. 3), the PCMCIA card with the boot software has already been removed from the PCMCIA connector 218, thereby permitting the processor 202 to only execute the boot software in the boot memory 206. After the boot software has been executed, the new software stored in the application memory 204 can be executed by the microprocessor 202 to control the chiller system 100.

In another embodiment of the present invention, the basic software loading process of FIGS. 4-7 can be used to load, update and/or change the boot software or initialization software stored in the boot memory 206. In order to be able to load software into the boot memory 206, some modifications to the boot device steering logic 220 may be required for the microprocessor 202 to be able to select and write to the boot memory 206. It is to be understood that any suitable configuration of the boot device steering logic 220 for enabling the microprocessor 202 to select and write to the boot memory 206 can be used.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of loading software into a control panel of a chiller system, the method comprising the steps of:
   inserting a linear flash PCMCIA card into a corresponding socket on a control panel of a chiller system;
   initializing the chiller system with a boot program stored on the linear flash PCMCIA card;
   copying a software program stored on the linear flash PCMCIA card to a memory device on the control panel with a copy program stored on the linear flash PCMCIA card; and
   removing the linear flash PCMCIA card from the corresponding socket on the control panel of the chiller system.

2. The method of claim 1 wherein the step of copying a software program includes the step of verifying that the software program has been copied successfully to the memory device on the control panel.

3. The method of claim 2 wherein the step of verifying that the software program has been copied successfully includes the step of comparing byte by byte program information stored in the memory device with corresponding program information stored in the PCMCIA card.

4. The method of claim 2 wherein the step of verifying that the software program has been copied successfully includes the steps of:
   calculating a checksum value for the copied software program stored in the memory device; and
   comparing the calculated checksum value with a corresponding checksum value for the software program stored in the PCMCIA card.

5. The method of claim 1 wherein the control panel comprises an application memory and a boot memory and the memory device on the control panel being one of the application memory and the boot memory.

6. The method of claim 5 wherein at least one of the application memory and the boot memory do not contain any software programs.

7. The method of claim 1 wherein the step of copying a software program includes the step of erasing the memory device before the software program stored on the linear flash PCMCIA card is transferred to the memory device.

8. The method of claim 1 wherein the step of copying a software program includes the steps of:
   displaying software installation information, the software installation information including a plurality of software programs stored in the linear flash PCMCIA card; and
   selecting a software program from the plurality of software programs to be installed in the memory device.

9. The method of claim 1 wherein the step of inserting a linear flash PCMCIA card includes the steps of:
   de-energizing the control panel;
   inserting the linear flash PCMCIA card into the corresponding socket of the control panel after the control panel has been de-energized; and
   energizing the control panel after the linear flash PCMCIA card is inserted in the corresponding socket of the control panel.

10. The method of claim 1 wherein the step of removing the linear flash PCMCIA card includes the steps of:
    de-energizing the control panel;
    removing the linear flash PCMCIA card from the corresponding socket of the control panel after the control panel has been de-energized; and
    energizing the control panel after the linear flash PCMCIA card is removed from the corresponding socket of the control panel.

11. A control panel for a chiller system, the control panel comprising:
    a microprocessor;
    a PCMCIA connector configured to receive a linear flash PCMCIA card, the PCMCIA connector being connected to the microprocessor by an address bus and a data bus to provide direct communication between the PCMCIA connector and the microprocessor;
    an application memory connected to the address bus and the data bus, the application memory being configured to store control software;
    a boot memory connected to the address bus and the data bus, the boot memory being configured to store initialization software; and
    steering logic, the steering logic being configured to initiate execution of initialization software stored in one of the boot memory and a linear flash PCMCIA card inserted in the PCMCIA connector.

12. The control panel of claim 11 wherein the microprocessor provides an output control signal to the steering logic to initiate a boot procedure for the control panel.

13. The control panel of claim 12 wherein the output control signal is an active low signal.

14. The control panel of claim 13 wherein the microprocessor provides the output control signal to the PCMCIA connector and the PCMCIA connector includes an active low input to receive the output control signal.

15. The control panel of claim 11 wherein the steering logic provides a boot signal to the boot memory.

16. The control panel of claim 15 wherein the boot memory comprises an active low input to receive the boot signal from the steering logic.

17. The control panel of claim 11 wherein the PCMCIA connector provides a card detect signal to the steering logic indicating a PCMCIA card is inserted in the PCMCIA connector.

18. The control panel of claim 17 wherein the card detect signal is an active low signal.

19. The control panel of claim 11 further comprising a display to present information to a user.

20. The control panel of claim 11 further comprising a data entry device and a device interface circuit connected to the data bus.

21. The control panel of claim 11 wherein:
   the microprocessor provides an output control signal to the steering logic to initiate a boot procedure for the control panel, the output control signal is an active low signal;
   the PCMCIA connector provides a card detect signal to the steering logic indicating a PCMCIA card is inserted in the PCMCIA connector, the card detect signal is an active low signal; and
   the steering logic further comprises:
      an inverter, the inverter being configured to invert the card detect signal from the PCMCIA connector; and
      an OR gate, the OR gate being configured to receive the output control signal and the inverted card detect signal as inputs and provide as an output a boot signal to the boot memory.

22. A method of loading software onto a plurality of chiller system control panels, the method comprising the steps of:
   inserting a linear flash PCMCIA card into a corresponding socket of a chiller system control panel;
   initializing a chiller system with a boot program stored on the linear flash PCMCIA card;
   copying a software program stored on the linear flash PCMCIA card to a memory device on the control panel with a copy program stored on the linear flash PCMCIA card;
   removing the linear flash PCMCIA card from the corresponding socket of the chiller system control panel; and
   repeating the steps of inserting a linear flash PCMCIA card, initializing a chiller system, copying a software program, and removing the linear flash PCMCIA card for another chiller system control panel.

23. The method of claim 22 wherein the step of copying a software program includes the step of verifying that the software program has been copied successfully to the memory device on the control panel.

24. The method of claim 22 wherein the step of copying a software program includes the step of erasing the memory device before the software program stored on the linear flash PCMCIA card is transferred to the memory device.

25. The method of claim 22 wherein the step of inserting a linear flash PCMCIA card includes the steps of:
   de-energizing the control panel;
   inserting the linear flash PCMCIA card into the corresponding socket of the control panel after the control panel has been de-energized; and
   energizing the control panel after the linear flash PCMCIA card is inserted in the corresponding socket of the control panel.

26. The method of claim 22 wherein the step of removing the linear flash PCMCIA card includes the steps of:
   de-energizing the control panel;
   removing the linear flash PCMCIA card from the corresponding socket of the control panel after the control panel has been de-energized; and
   energizing the control panel after the linear flash PCMCIA card is removed from the corresponding socket of the control panel.

* * * * *